(12) United States Patent
Hassan et al.

(10) Patent No.: US 8,015,868 B2
(45) Date of Patent: *Sep. 13, 2011

(54) FORMATION EVALUATION USING ESTIMATED BOREHOLE TOOL POSITION

(75) Inventors: Gamal A. Hassan, Houston, TX (US); Philip L. Kurkoski, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 677 days.

This patent is subject to a terminal disclaimer.

(21) Appl. No.: 12/051,696

(22) Filed: Mar. 19, 2008

(65) Prior Publication Data

US 2009/0084176 A1    Apr. 2, 2009

Related U.S. Application Data

(63) Continuation-in-part of application No. 11/863,052, filed on Sep. 27, 2007, now Pat. No. 7,548,817.

(51) Int. Cl.
*E21B 44/00* (2006.01)
*G01V 1/40* (2006.01)

(52) U.S. Cl. .................................. 73/152.46; 702/9
(58) Field of Classification Search ............... 73/152.03, 73/152.05, 152.43, 152.46; 702/6, 9
See application file for complete search history.

(56) References Cited

U.S. PATENT DOCUMENTS

| | | | |
|---|---|---|---|
| 4,297,575 A | 10/1981 | Smith, Jr. et al. | |
| 4,346,460 A | 8/1982 | Schuster | |
| 5,017,778 A | 5/1991 | Wraight | |
| 5,081,613 A * | 1/1992 | Holzhausen et al. | 367/86 |
| 5,678,643 A * | 10/1997 | Robbins et al. | 175/45 |
| 5,987,385 A * | 11/1999 | Varsamis et al. | 702/6 |
| 6,237,404 B1 | 5/2001 | Crary et al. | |
| 6,307,199 B1 * | 10/2001 | Edwards et al. | 250/269.3 |
| 6,584,837 B2 | 7/2003 | Kurkoski | |
| 6,898,967 B2 * | 5/2005 | Macpherson | 73/152.05 |
| 7,000,700 B2 | 2/2006 | Cairns et al. | |
| 7,272,504 B2 * | 9/2007 | Akimov et al. | 702/9 |
| 7,295,928 B2 * | 11/2007 | Hassan et al. | 702/9 |
| 7,424,365 B2 * | 9/2008 | Hassan et al. | 702/7 |
| 7,548,817 B2 * | 6/2009 | Hassan et al. | 702/9 |
| 7,558,675 B2 * | 7/2009 | Sugiura | 702/9 |
| 2002/0008197 A1 * | 1/2002 | Mickael | 250/269.2 |
| 2004/0158997 A1 * | 8/2004 | Tang | 33/304 |
| 2006/0106541 A1 | 5/2006 | Hassan et al. | |
| 2007/0137896 A1 | 6/2007 | Villareal et al. | |
| 2007/0234787 A1 * | 10/2007 | Rabinovich et al. | 73/152.02 |
| 2008/0078242 A1 * | 4/2008 | Hassan et al. | 73/152.29 |
| 2008/0307875 A1 * | 12/2008 | Hassan et al. | 73/152.16 |
| 2009/0065252 A1 * | 3/2009 | Moos et al. | 175/50 |

* cited by examiner

*Primary Examiner* — John Fitzgerald
(74) *Attorney, Agent, or Firm* — Mossman Kumar & Tyler PC

(57) ABSTRACT

Caliper measurements made during rotation of an imager on a logging string are processed to estimate the location of the imager, and size and shape of the borehole. A piecewise elliptical fitting procedure may be used. These estimates may be used to correct measurements made by a standoff-sensitive formation evaluation sensor such as a neutron porosity tool. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

21 Claims, 17 Drawing Sheets

FORMATION EVALUATION USING ESTIMATED BOREHOLE TOOL POSITION

CROSS-REFERENCES TO RELATED APPLICATIONS

This application claims priority as a continuation-in-part of U.S. patent application Ser. No. 11/863,052 of Hassan et al, filed on Sep. 27, 2007, which claimed priority from U.S. Provisional Patent Application Ser. No. 60/847,948 filed on Sep. 28, 2006 and from U.S. Provisional Patent Application Ser. No. 60/849,962 filed on Oct. 6, 2006.

TECHNICAL FIELD OF THE PRESENT DISCLOSURE

The present disclosure relates generally to devices, systems, and methods of geological exploration in wellbores. More particularly, the present disclosure describes a device, a system, and a method useful for determining a downhole formation evaluation tool position in a borehole during drilling.

BACKGROUND OF THE PRESENT DISCLOSURE

A variety of techniques are currently utilized in determining the presence and estimation of quantities of hydrocarbons (oil and gas) in earth formations. These methods are designed to determine formation parameters, including, among other things, the resistivity, porosity, and permeability of the rock formation surrounding the wellbore drilled for recovering the hydrocarbons. Typically, the tools designed to provide the desired information are used to log the wellbore. Much of the logging is done after the wellbores have been drilled. More recently, wellbores have been logged while drilling, which is referred to as measurement-while-drilling (MWD) or logging-while-drilling (LWD). One advantage of MWD techniques is that the information about the rock formation is available at an earlier time when the formation is not yet damaged by an invasion of the drilling mud. Thus, MWD logging may often deliver better formation evaluation (FE) data quality. In addition, having the formation evaluation (FE) data available already during drilling may enable the use of the FE data to influence decisions related to the ongoing drilling (such as geo-steering, for example). Yet another advantage is the time saving and, hence, cost saving if a separate wireline logging run can be avoided.

For an accurate analysis of some FE measurements, for example, neutron porosity (NP) measurements and/or neutron density (ND) measurements, and the like, it is important to know the actual downhole formation evaluation (FE) tool position in a borehole during drilling. By way of example, an 8-sector azimuthal caliper with 16 radii allows the determination of the exact center of the downhole formation evaluation (FE) tool in the borehole during drilling and a magnetometer allows the determination of the exact orientation of the detector face. These two parameters allow optimization of the environmental borehole effects, such as correction for borehole size and mud.

However, conventional corrections typically assume one of two conditions. Either (1) the downhole formation evaluation (FE) tool is eccentered (the FE tool center is eccentrically located with respect to the "true" center of the borehole and the FE tool center does not coincide with the true center of the borehole), and appropriate eccentered FE tool corrections are used, or (2) the downhole formation evaluation (FE) tool is centered (the FE tool center is not eccentrically located with respect to the true center of the borehole and the FE tool center does coincide with the true center of the borehole) and appropriate centered FE tool corrections are used.

In the eccentered case, conventionally an average eccentered correction for constant rotation of the FE tool is assumed whereby the FE tool is assumed to face the formation about 50% of the time and to face into the borehole about 50% of the time. However, the conventional approaches are not able to allow the selection of the proper environmental corrections to apply generally, lacking any way to track the FE tool center and direction with respect to the borehole center. For a non-azimuthal FE tool, for example, the conventional approaches lack any way to extrapolate between (1) the eccentered and (2) the centered cases described above, even assuming constant FE tool rotation. Similarly, for an azimuthal FE tool, where the diluting effects of the FE tool rotation may not appear, the conventional approaches lack any way to provide an absolute standoff correction correcting for the FE tool location and orientation in the borehole.

While it has long been known that two-way travel time of an acoustic signal through a borehole contains geometric information about the borehole, methods of efficiently obtaining that geometric information acoustically continue to need improvement. In particular, a need exists for efficient ways to obtain such geometric information about a borehole to overcome, or at least substantially ameliorate, one or more of the problems described above.

SUMMARY OF THE PRESENT DISCLOSURE

One embodiment of the disclosure is a method of evaluating an earth formation. The method includes conveying a logging string into a borehole, making rotational measurements using an imaging instrument of a distance to a wall of the borehole, processing the measurements of the distance to estimate a geometry of the borehole wall and a location of the imaging instrument in the borehole. The method further includes estimating a value of a property of the earth formation using a formation evaluation sensor, the estimated geometry and the estimated location of the imaging instrument. The method may further include measuring an amplitude of a reflected acoustic signal from the wall of the borehole. The method may further include estimating a standoff of the formation evaluation sensor and estimating the value of the property of the earth formation using the estimated standoff. Estimating the geometry of the borehole may further include performing a least-squares fit to the measurements of the distance. Estimating the geometry of the borehole may further include rejecting an outlying measurement and/or defining an image point when the measurements of the distance have a limited aperture. The method may further include providing an image of the distance to the borehole wall. The method may further include providing a 3-D view of the borehole, identifying a washout and/or identifying a defect in the casing. The method may further include using the estimated geometry of the borehole to determine a compressional-wave velocity of a fluid in the borehole. The method may further include binning the measurements made with the formation evaluation sensor.

Another embodiment of the disclosure is an apparatus for evaluating an earth formation. The apparatus includes a logging string configured to be conveyed into a borehole, and an imager configured to make rotational measurements of a distance to a wall of the borehole, and a formation evaluation sensor configured to make a measurement of the property of the earth formation. The apparatus also includes at least one processor configured to use the measurements of the distance to the borehole wall to estimate the geometry of the borehole and a location of the imager in the borehole, and estimate of value of the property of the earth formation using the measurement of the formation evaluation sensor, the estimated geometry, and the estimated location of the imager. The imager may be further configured to make measurements of an amplitude of acoustic signals reflected from the borehole wall. The at least one processor may be further configured to estimate a standoff of the formation evaluation sensor, and use the measurements made by the formation evaluation sensor and the estimated standoff to estimate the value of the property of the earth formation. The at least one processor may be configured to estimate the geometry of the borehole by performing a least-squares fit of the measurements of the distance. The at least one processor may be further configured to estimate the geometry of the borehole by rejecting an outlying measurement and/or defining an image point when the measurements of the distance have a limited aperture. The at least one processor may be further configured to provide an image of the distance to the borehole wall. The at least one processor may be further configured to provide a 3-D view of the borehole, identify of washout and/or identify a defect in a casing. The at least one process may be further configured to use the estimated geometry to determine a compressional wave velocity of the fluid in the borehole. The at least one processor may be further configured to bin the measurements made by the formation evaluation sensor. The apparatus may further include a wireline configured to convey the logging string into the borehole.

Another embodiment is a computer readable medium for use with an apparatus for evaluating an earth formation. The apparatus includes a logging string configured to be conveyed into a borehole, and an imager configured to make rotational measurements of a distance to a wall of the borehole, and a formation evaluation sensor configured to make a measurement of a property of the earth formation. The medium includes instructions that enable a processor to use the measurements of the distance to the borehole wall to estimate a geometry of the borehole and the location of the imager in the borehole, and estimate the value of the property of the earth formation using the measurement of the formation evaluation sensor, the estimated geometry and the estimated location of the imager. The computer readable medium may include a ROM, an EPROM, an EEPROM, a flash memory, and/or an optical disk.

BRIEF DESCRIPTION OF THE DRAWINGS

The present disclosure is best understood with reference to the accompanying figures in which like numerals refer to like elements and in which.

DETAILED DESCRIPTION OF ILLUSTRATIVE EMBODIMENTS

Illustrative embodiments of the present disclosure are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of the present disclosure.

Figure 1:
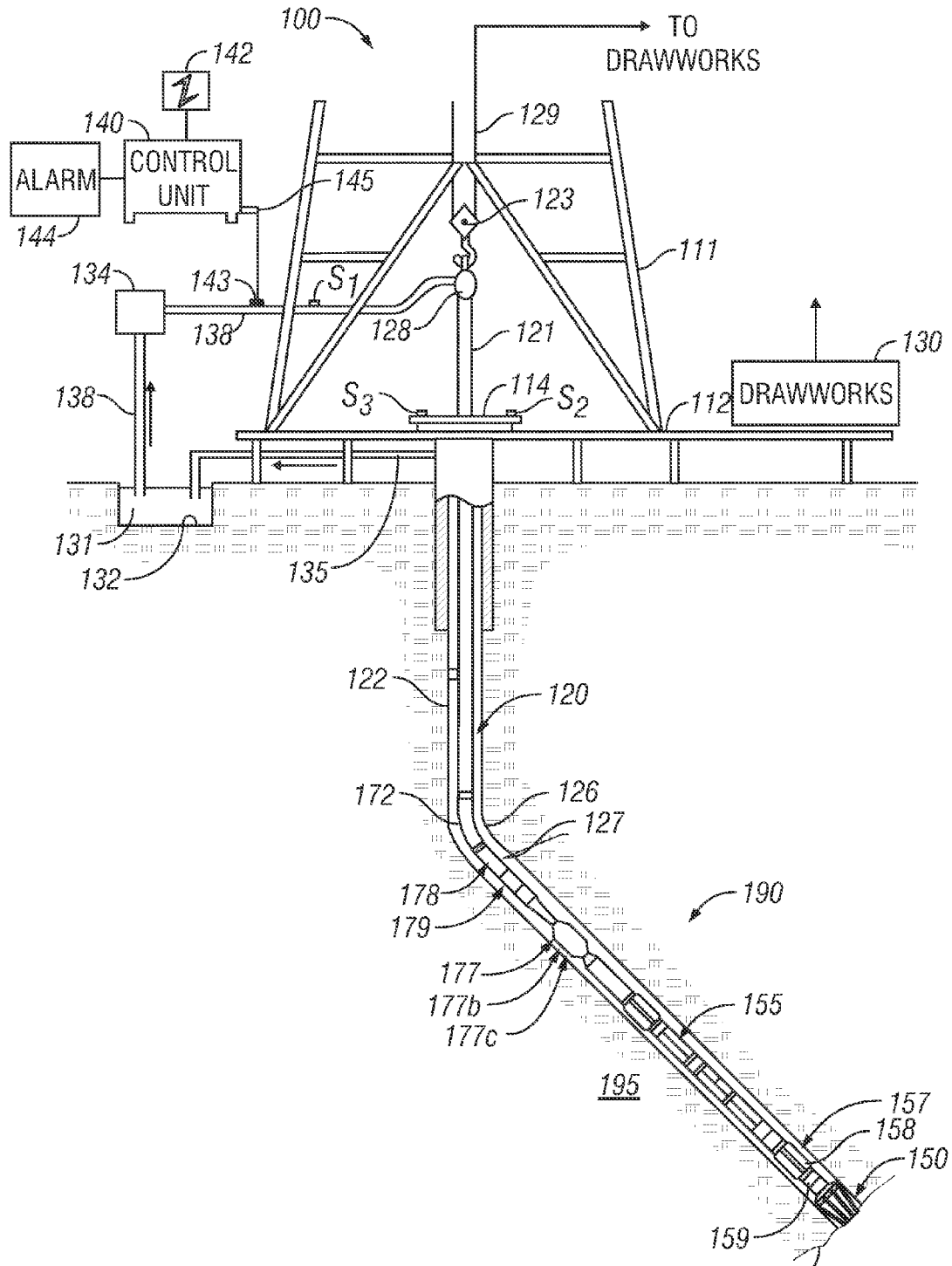
FIG. 1 (prior art) schematically illustrates a drilling system suitable for use with the present disclosure.

Referring first to FIG. 1, a schematic diagram is shown of a drilling system 100 useful in various illustrative embodiments, the drilling system 100 having a drillstring 120 carrying a drilling assembly 190 (also referred to as a bottomhole assembly, or "BHA") conveyed in a "wellbore" or "borehole" 126 for drilling the wellbore 126 into geological formations 195. The drilling system 100 may include a conventional derrick 111 erected on a floor 112 that may support a rotary table 114 that may be rotated by a prime mover such as an electric motor (not shown) at a desired rotational speed. The drillstring 120 may include tubing such as a drill pipe 122 or a coiled-tubing extending downward from the surface into the borehole 126. The drillstring 120 may be pushed into the wellbore 126 when the drill pipe 122 is used as the tubing. For coiled-tubing applications, a tubing injector (not shown), however, may be used to move the coiled-tubing from a source thereof, such as a reel (not shown), to the wellbore 126. A drill bit 150 may be attached to the end of the drillstring 120, the drill bit 150 breaking up the geological formations 195 when the drill bit 150 is rotated to drill the borehole 126. If the drill pipe 122 is used, the drillstring 120 may be coupled to a drawworks 130 via a Kelly joint 121, a swivel 128, and a line 129 through a pulley 123. During drilling operations, the drawworks 130 may be operated to control the weight on the drill bit 150 or the "weight on bit," which is an important parameter that affects the rate of penetration (ROP) into the geological formations 195. The operation of the drawworks 130 is well known in the art and is thus not described in detail herein.

During drilling operations, in various illustrative embodiments, a suitable drilling fluid 131 (also known and/or referred to sometimes as "mud" or "drilling mud") from a mud pit (source) 132 may be circulated under pressure through a channel in the drillstring 120 by a mud pump 134. The drilling fluid 131 may pass from the mud pump 134 into the drillstring 120 via a desurger (not shown), a fluid line 138, and the Kelly joint 121. The drilling fluid 131 may be discharged downhole at a borehole bottom 151 through an opening (not shown) in the drill bit 150. The drilling fluid 131 may circulate uphole through an annular space 127 between the drillstring 120 and the borehole 126 and may return to the mud pit 132 via a return line 135. The drilling fluid 131 may act to lubricate the drill bit 150 and/or to carry borehole 126 cuttings and/or chips away from the drill bit 150. A flow rate and/or a mud 131 dynamic pressure sensor $S_1$ may typically be placed in the fluid line 138 and may provide information about the drilling fluid 131 flow rate and/or dynamic pressure, respectively. A surface torque sensor $S_2$ and a surface rotational speed sensor $S_3$ associated with the drillstring 120 may provide information about the torque and the rotational speed of the drillstring 120, respectively. Additionally, and/or alternatively, at least one sensor (not shown) may be associated with the line 129 and may be used to provide the hook load of the drillstring 120.

The drill bit 150 may be rotated by only rotating the drill pipe 122. In various other illustrative embodiments, a downhole motor 155 (mud motor) may be disposed in the bottomhole assembly (BHA) 190 to rotate the drill bit 150 and the drill pipe 122 may be rotated usually to supplement the rotational power of the mud motor 155, if required, and/or to effect changes in the drilling direction. In various illustrative embodiments, electrical power may be provided by a power unit 178, which may include a battery sub and/or an electrical generator and/or alternator generating electrical power by using a mud turbine coupled with and/or driving the electrical generator and/or alternator. Measuring and/or monitoring the amount of electrical power output by a mud generator included in the power unit 178 may provide information about the drilling fluid (mud) 131 flow rate.

The mud motor 155 may be coupled to the drill bit 150 via a drive shaft (not shown) disposed in a bearing assembly 157. The mud motor 155 may rotate the drill bit 150 when the drilling fluid 131 passes through the mud motor 155 under pressure. The bearing assembly 157 may support the radial and/or the axial forces of the drill bit 150. A stabilizer 158 may be coupled to the bearing assembly 157 and may act as a centralizer for the lowermost portion of the mud motor 155 and/or the bottomhole assembly (BHA) 190.

A drilling sensor module 159 may be placed near the drill bit 150. The drilling sensor module 159 may contain sensors, circuitry, and/or processing software and/or algorithms relating to dynamic drilling parameters. Such dynamic drilling parameters may typically include bit bounce of the drill bit 150, stick-slip of the bottomhole assembly (BHA) 190, backward rotation, torque, shocks, borehole and/or annulus pressure, acceleration measurements, and/or other measurements of the drill bit 150 condition. A suitable telemetry and/or communication sub 172 using, for example, two-way telemetry, may also be provided, as illustrated in the bottomhole assembly (BHA) 190 in FIG. 1, for example. The drilling sensor module 159 may process the raw sensor information and/or may transmit the raw and/or the processed sensor information to a surface control and/or processor 140 via the telemetry system 172 and/or a transducer 143 coupled to the fluid line 138, as shown at 145, for example.

The communication sub 172, the power unit 178, and/or a formation evaluation (FE) tool 179, such as an appropriate measuring-while-drilling (MWD) tool, for example, may all be connected in tandem with the drillstring 120. Flex subs, for example, may be used in connecting the FE tool 179 in the bottomhole assembly (BHA) 190. Such subs and/or FE tools 179 may form the bottomhole assembly (BHA) 190 between the drillstring 120 and the drill bit 150. The bottomhole assembly (BHA) 190 may make various measurements, such as pulsed nuclear magnetic resonance (NMR) measurements and/or nuclear density (ND) measurements, for example, while the borehole 126 is being drilled. In various illustrative embodiments, the bottomhole assembly (BHA) 190 may include one or more formation evaluation and/or other tools and/or sensors 177, such as one or more acoustic transducers and/or acoustic detectors and/or acoustic receivers 177a, capable of making measurements of the distance of a center of the downhole FE tool 179 from a plurality of positions on the surface of the borehole 126, over time during drilling, and/or one or more mechanical or acoustic caliper instruments 177b.

A mechanical caliper may include a plurality of radially spaced apart fingers, each of the plurality of the radially spaced apart fingers capable of making measurements of the distance of the center of the downhole FE tool 179 from a plurality of positions on the borehole wall 126, over time during drilling, for example. An acoustic caliper may include one or more acoustic transducers which transmit acoustic signals into the borehole fluid and measure the travel time for acoustic energy to return from the borehole wall. In one embodiment of the disclosure, the transducer produces a collimated acoustic beam, so that the received signal may represent scattered energy from the location on the borehole wall where the beam impinges. In this regard, the acoustic caliper measurements are similar to measurements made by a mechanical caliper. The discussion of the disclosure below is based on such a configuration.

In an alternate embodiment of the disclosure, the acoustic transducer may emit a beam with wide angular coverage. In such a case, the signal received by the transducer may be a signal resulting from specular reflection of the acoustic beam at the borehole wall. The method of analysis described below would need to be modified for such a caliper.

Still referring to FIG. 1, the communication sub 172 may obtain the signals and/or measurements and may transfer the signals, using two-way telemetry, for example, to be processed on the surface, either in the surface control and/or processor 140 and/or in another surface processor (not shown). Alternatively, and/or additionally, the signals may be processed downhole, using a downhole processor 177c in the bottomhole assembly (BHA) 190, for example.

The surface control unit and/or processor 140 may also receive signals from one or more other downhole sensors and/or devices and/or signals from the flow rate sensor $S_1$, the surface torque sensor $S_2$, and/or the surface rotational speed sensor $S_3$ and/or other sensors used in the drilling system 100 and/or may process such signals according to programmed instructions provided to the surface control unit and/or processor 140. The surface control unit and/or processor 140 may display desired drilling parameters and/or other information on a display/monitor 142 that may be utilized by an operator (not shown) to control the drilling operations. The surface control unit and/or processor 140 may typically include a computer and/or a microprocessor-based processing system, at least one memory for storing programs and/or models and/or data, a recorder for recording data, and/or other peripherals. The surface control unit and/or processor 140 may typically be adapted to activate one or more alarms 144 whenever certain unsafe and/or undesirable operating conditions may occur.

Figure 2:
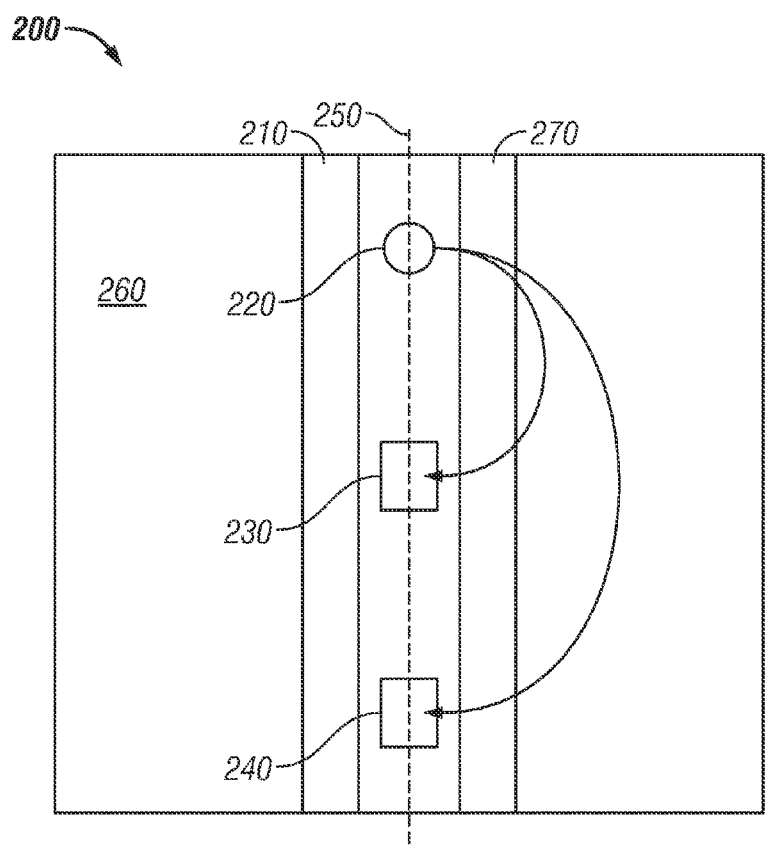
FIG. 2 schematically illustrates neutron porosity (NP) measurement techniques, according to the present disclosure.
Figure 3:
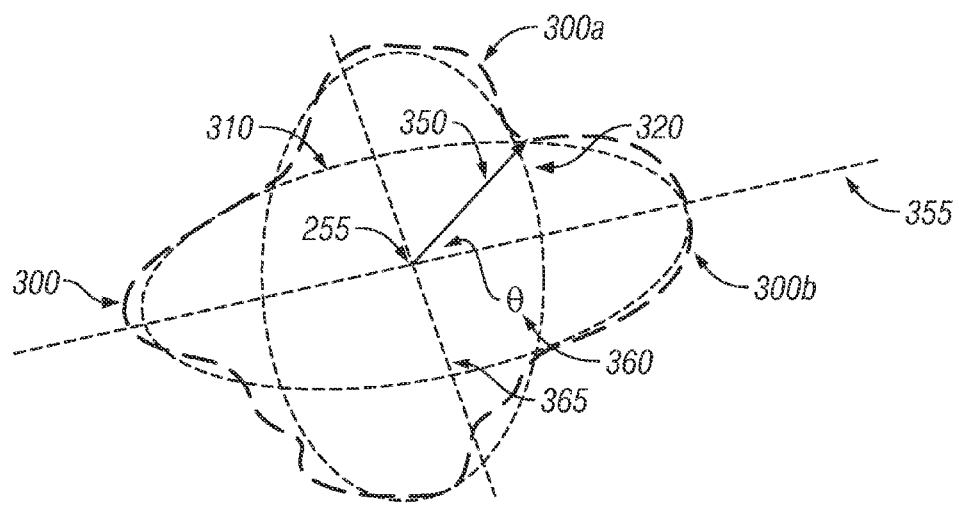
FIG. 3 shows the principle of fitting an ellipse to data points.

In accordance with the present disclosure, a device, a system, and a method useful for determining the downhole formation evaluation (FE) tool 179 position in the borehole 126 during drilling are disclosed. The knowledge of this downhole FE tool 179 position in the borehole 126 can be used for improving certain formation evaluation (FE) measurement techniques, such as neutron porosity (NP) measurement techniques and/or neutron density (ND) measurement techniques, and the like. As shown in FIG. 2, for example, neutron porosity (NP) measurement techniques may be schematically illustrated, as shown generally at 200. A neutron porosity (NP) FE tool 179, schematically illustrated at 210, may be disposed downhole in the borehole 126, which may be an open borehole, as illustrated schematically at 250, for example. The NP tool 210 may include a neutron source 220, a near neutron detector 230, nearer to the neutron source 220, and a far neutron detector 240, farther away from the neutron source 220. The neutron source 220, the near neutron detector 230, and the far neutron detector 240 may be disposed along a central axis of the borehole 250.

The neutron source 220 may be arranged to produce neutrons that penetrate into a formation 260 near the open borehole 250, which may be surrounded by drilling mud 270, for example, some portion of the neutrons interacting with the formation 260 and then subsequently being detected by either the near neutron detector 230 or the far neutron detector 240. The neutron counting rates detected at the near neutron detector 230 may be compared with the neutron counting rates detected at the far neutron detector 240, for example, by forming an appropriate counting rate ratio. Then, the appropriate counting rate ratio obtained by the NP tool 210 may be compared with a respective counting rate ratio obtained by substantially the same NP tool 210 (or one substantially similar thereto) under a variety of calibration measurements taken in a plethora of environmental conditions such as are expected and/or likely to be encountered downhole in such an open borehole 250 (as described in more detail below).

The basic methodology used in the present disclosure assumes that the borehole has an irregular surface, and approximates it by a piecewise elliptical surface. This is generally shown by the surface 300. The center of the tool is at the position indicated by 255. The distance 350 from the center of the tool to the borehole wall is measured by a caliper as the tool rotates. In the example shown, the borehole wall may be approximated by two ellipses denoted by 310 and 320. The major axes of the two ellipses are denoted by 355 and 365 respectively. The points 300a, 300b are exemplary points on the borehole wall at which distance measurements are made.

For the case where the tool is in a fixed position at the a circular borehole, the borehole wall may be represented by the equation:

$$(x-x_0)^2+(y-y_0)^2=R^2 \qquad (1),$$

where $(x_0, y_0)$ is the coordinate of the center of the FE tool and R is the radius. The distance R may be given by $$R = r_t + \frac{v\Delta t}{2}, \qquad (2)$$

Where $r_t$ is the tool radius, v is the velocity of sound in the borehole fluid, and $\Delta t$ is the two way transit time measured by an acoustic caliper. For a mechanical caliper, the second term on the right hand side of eq. (2) is simply the distance measured by the caliper. Measurements of the distance R and the angle θ define the borehole wall in polar coordinates in a tool centered coordinate system.

For an elliptical borehole, the borehole wall may be represented by an equation of the form:

$$ax^2+by^2+cxy+dx+ey+f=0 \qquad (3).$$

Figure 4:
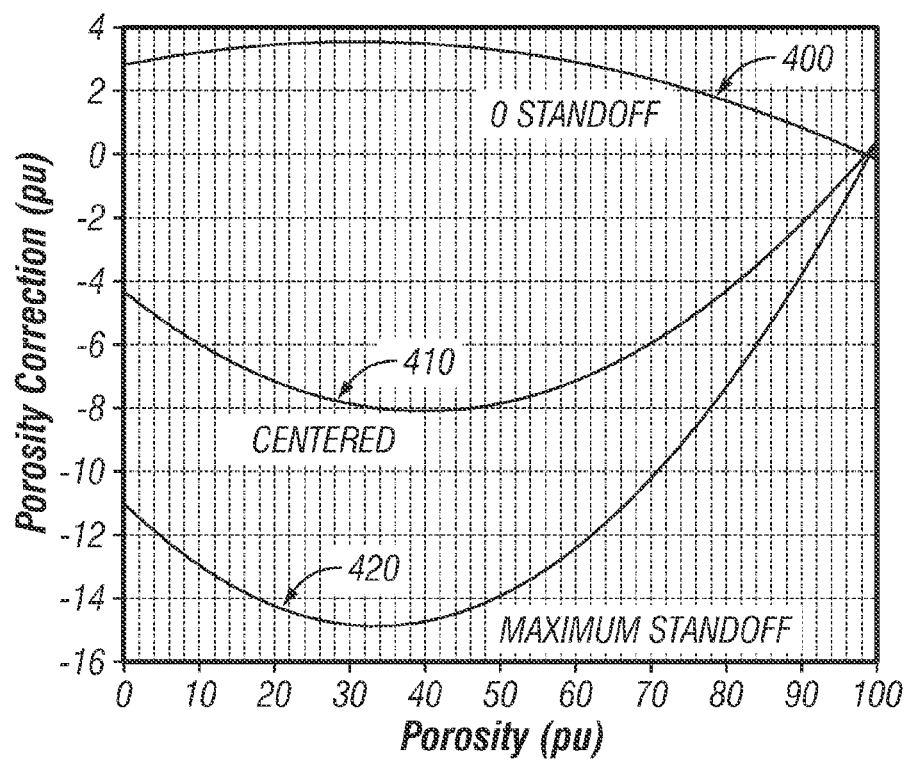
FIG. 4 illustrates exemplary correction that has to be applied to porosity measurements to account for tool standoff from a borehole wall.

In the real world, the center of the tool does not stay in a fixed position, the caliper measurements are subject to measurement noise and the borehole wall is irregular. The combination of all these factors makes it problematic to determine the actual offset of a neutron porosity sensor from the wall of the borehole. The importance of knowing this offset of the sensor is illustrated by the example of FIG. 4. The abscissa is the true porosity of a formation. The ordinate is the correction that must be applied to a measured porosity (given by the ratio of the counts at the near detector and the far detector). The curve 400 is a correction that must be applied when there is zero standoff of the neutron porosity sensor. The curve 410 is the correction that must be applied when the tool is centered in the borehole. The curve 420 is the correction that must be applied when there is maximum standoff of the sensor, i.e., when the tool is displaced from the center of the borehole in a direction opposite to the sensor position on the tool. It should be noted that the curves in FIG. 4 are for exemplary purposes only and the actual curves would depend upon the tool and borehole diameters, the mud density and the formation lithology.

Figure 5A:
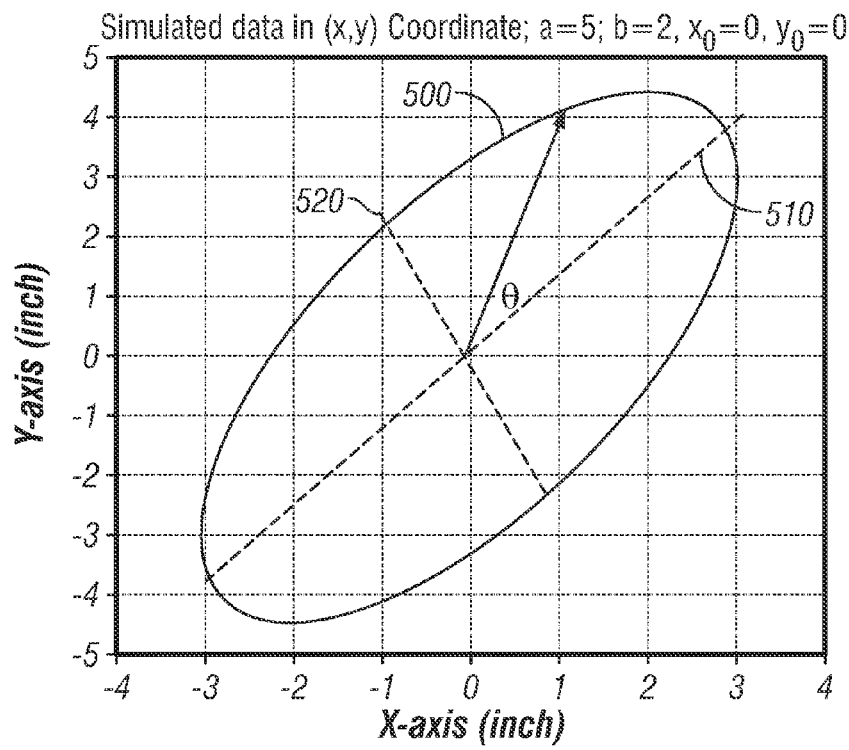
FIGS. 5A, 5B, 5C and 5D illustrate exemplary measurements that would be made by a rotating standoff sensor in an elliptical borehole.

We next illustrate, by example, measurements that would be made by a rotating tool in an elliptical borehole. 500 in FIG. 5A illustrates an ellipse having a major axis 510 of 5 inches and a minor axis 520 of 2 inches. As a centered tool rotates, the measurements shown by 550 in FIG. 5B would result. The abscissa is the rotation angle θ and the ordinate is the measured distance from the tool center to the borehole wall. The curve 560 in FIG. 5C shows the variation of the measured distance with θ when the tool center is at the position ($x_0=1$, $y_0=1$), while the curve 570 in FIG. 5C shows the variation of the measured distance with θ when the tool center is at the location ($x_0=1$, $y_0=1$).

Figure 5B:
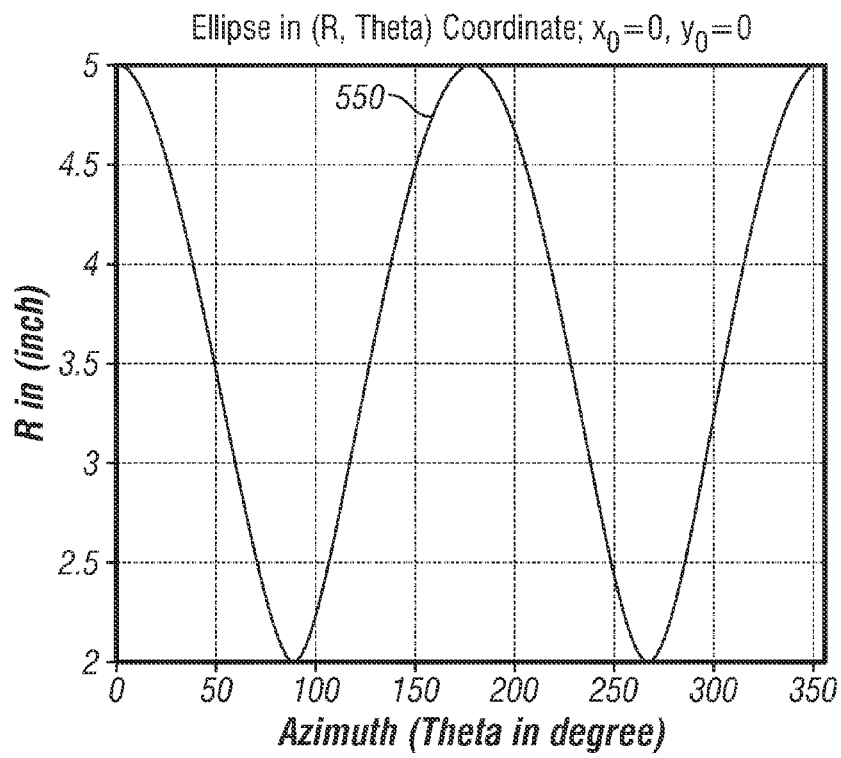
Figure 5C:
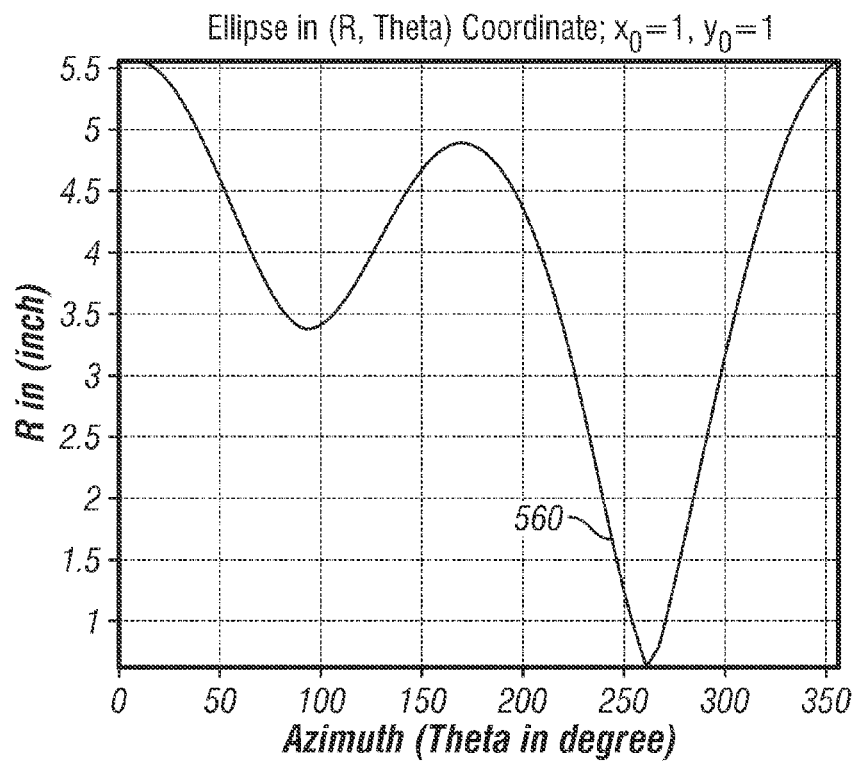
Figure 5D:
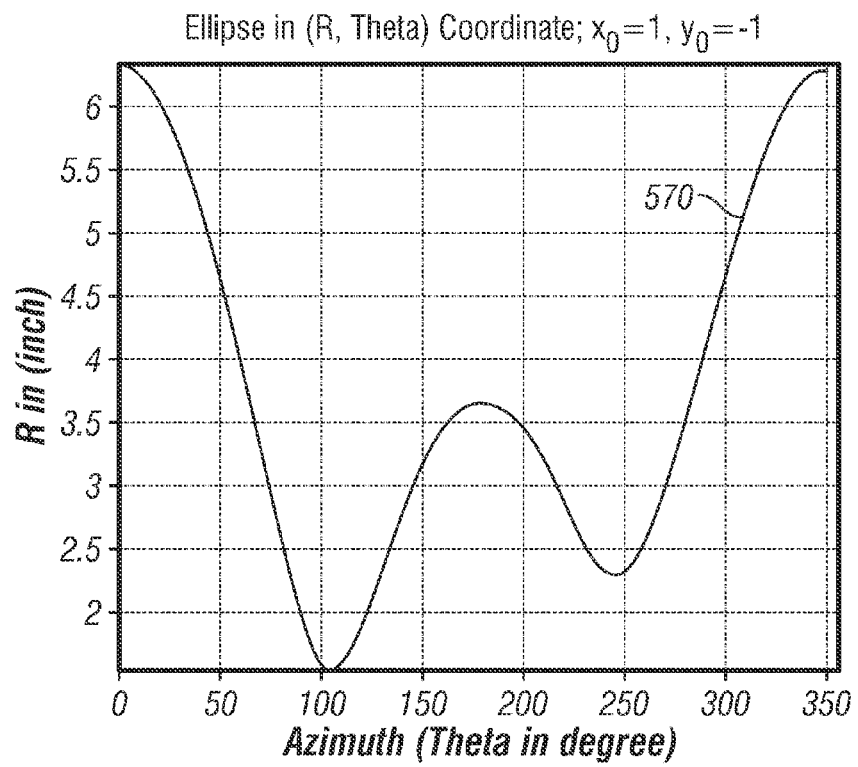

One embodiment of the present disclosure estimates the location of the tool center during rotation of the tool along with an estimate of the geometry of the borehole wall using a least squares fit of the measurements such as those shown in FIGS. 5B-5D. In one embodiment of the disclosure, the fitting is done using data from a single 360° scan at a time. The 360° scan would correspond to a complete rotation of the tool if a single caliper or acoustic transducer is used, would correspond to half a rotation of the tool if two calipers or acoustic transducers were used and so on. The basic fitting technique is a piecewise circular fit in Cartesian coordinates (to a form such as equation 1) or a piecewise elliptical fit in Cartesian coordinates (to a form such as equation 2).

Figure 6:
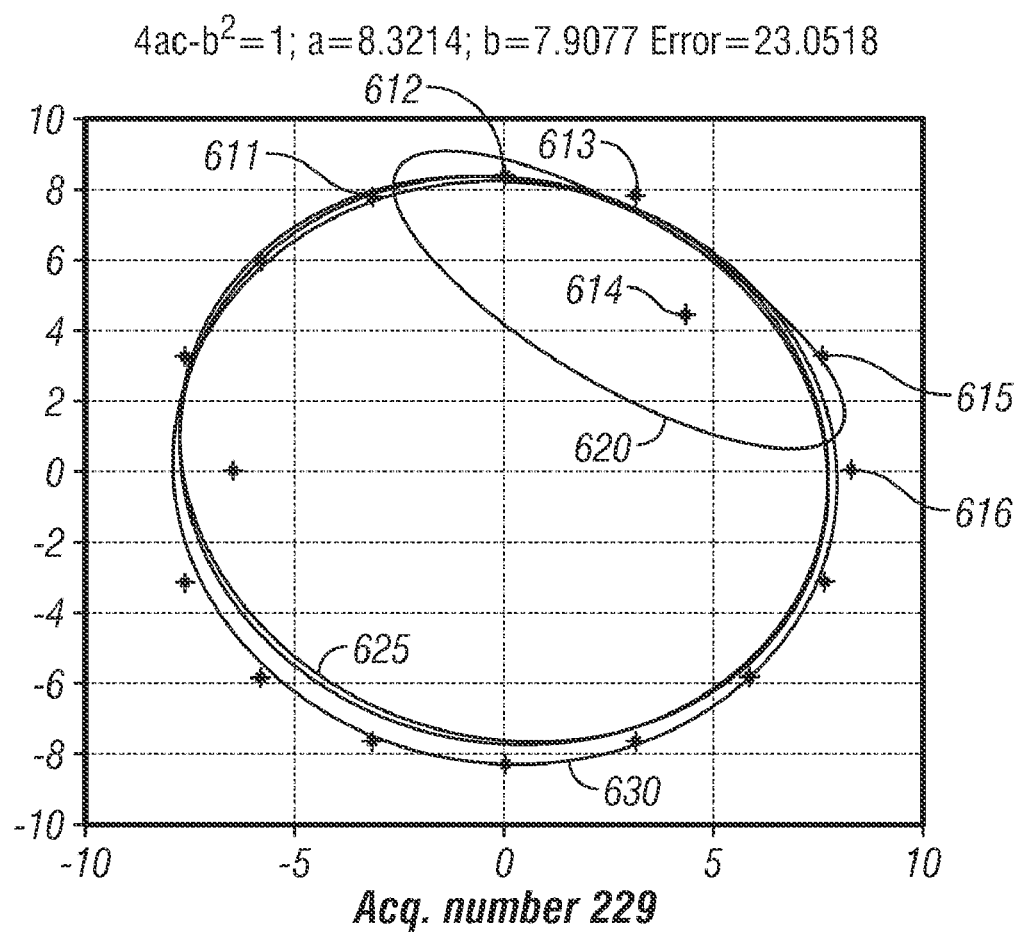
FIG. 6 illustrates a correction made in the method of the present disclosure to account for measurements made in a limited portion of the borehole.

Turning now to FIG. 6, one aspect of the piecewise fitting is discussed. What is evaluated here is the robustness of the curve fitting procedure when data are only available over a limited aperture of the 360° scan. Such a situation may occur in a highly deviated borehole where the tool has a very small offset from the bottom of the borehole. Due to the large offset from the top of the borehole, acoustic signals may not be measurable. In the example, data were actually recorded over the full 360° scan. Fitting the data to the full 360° scan gives the ellipse defined by the curve 630. When data from a limited aperture denoted by 611, 612, 613, 614 and 615 were used for an elliptical fit, the curve 620 results. This is clearly misleading.

What is done in the present disclosure is that when data from only a limited aperture are available, a circular fit is first done to the data. The circular fit defines the center of a circle. Each of the points 611, 612, 613, 614 and 615 is used to define an image point on the opposite side of the circle. For clarity, these image points are not shown in FIG. 6. Following the generation of the image points, an elliptical fit is applied to the original data points 611, 612, 613, 614 and 615 and their image points. This elliptical fit is shown by 625 in FIG. 6 and is seen to be quite close to an elliptical fit to actual measurements over the full 360° scan.

Figure 7B:
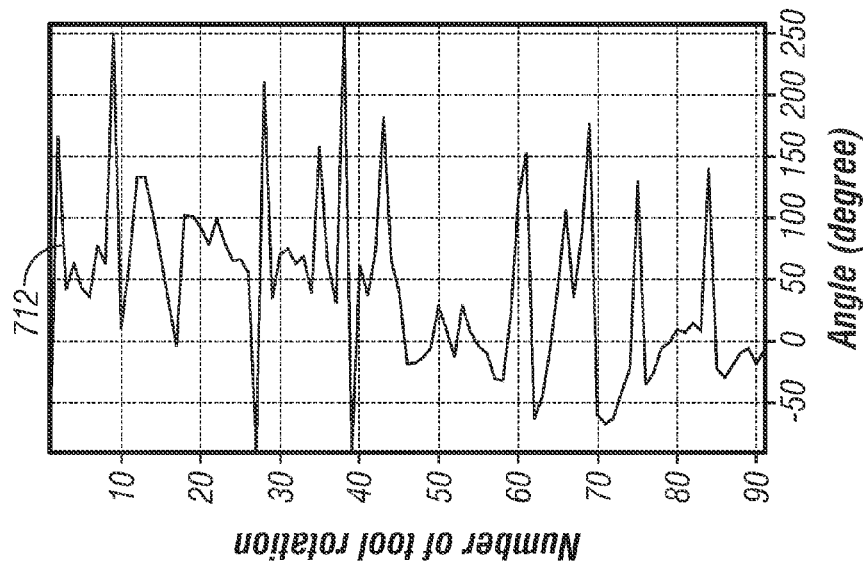
FIGS. 7A and 7B show exemplary corrected distance and azimuth determinations.
Figure 7A:
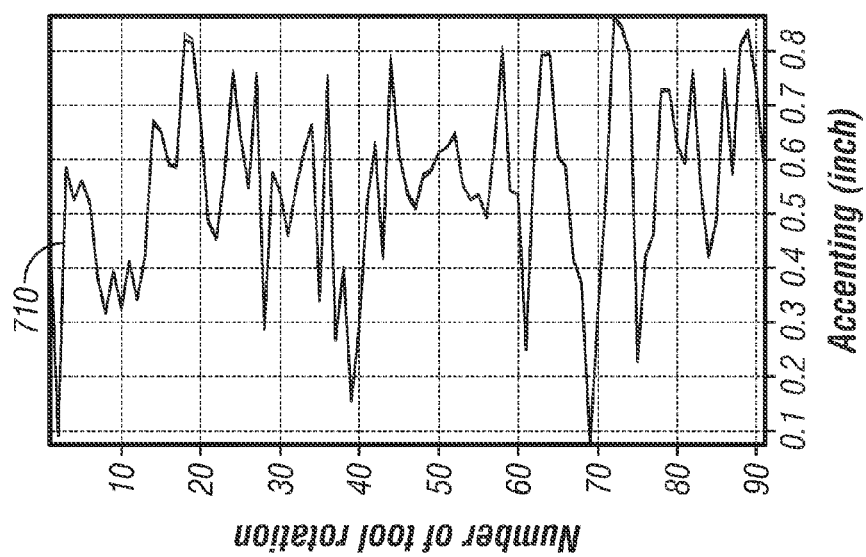

Turning next to FIGS. 7A and 7B, an exemplary display of the present disclosure is shown. FIG. 7A shows the magnitude of the eccentering (abscissa) as a function of depth (ordinate). In the example, both circular and elliptical fits were made, but the results are indistinguishable 710. FIG. 7B shows the direction of the eccentering as a function of depth. Again, the results of the circular and elliptical fits are indistinguishable.

Figure 8A:
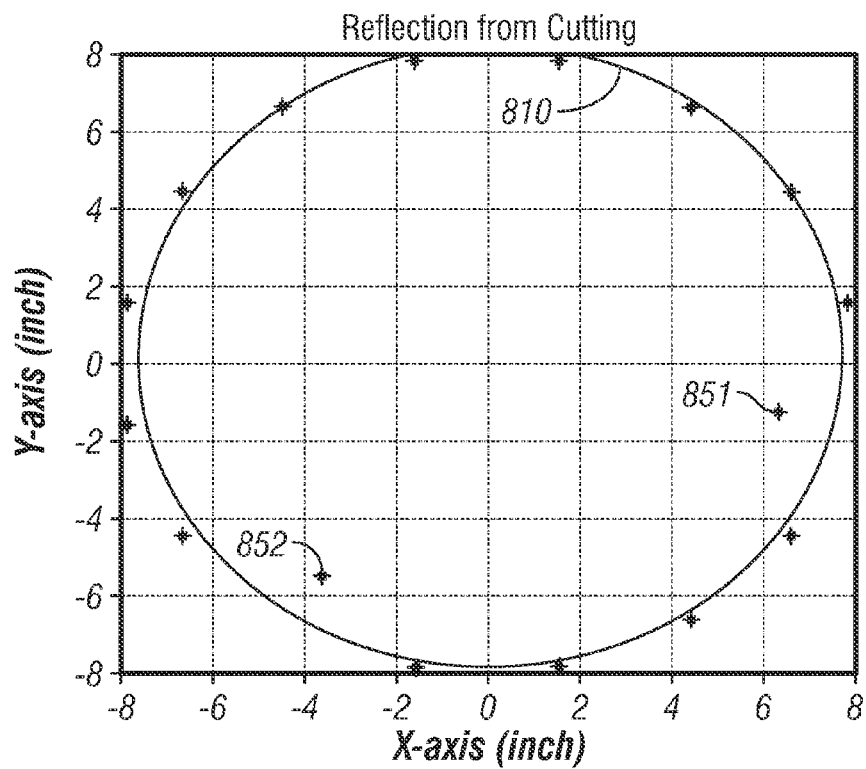
FIGS. 8A-8D illustrate the use of elimination of outliers in the statistical fitting method of the present disclosure.
Figure 8B:
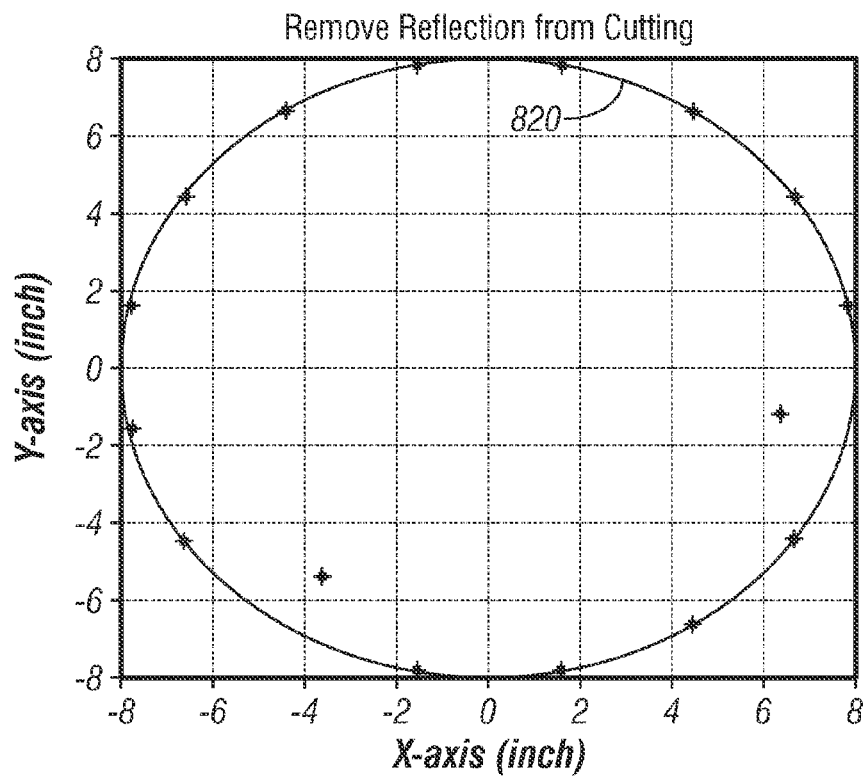
Figure 8C:
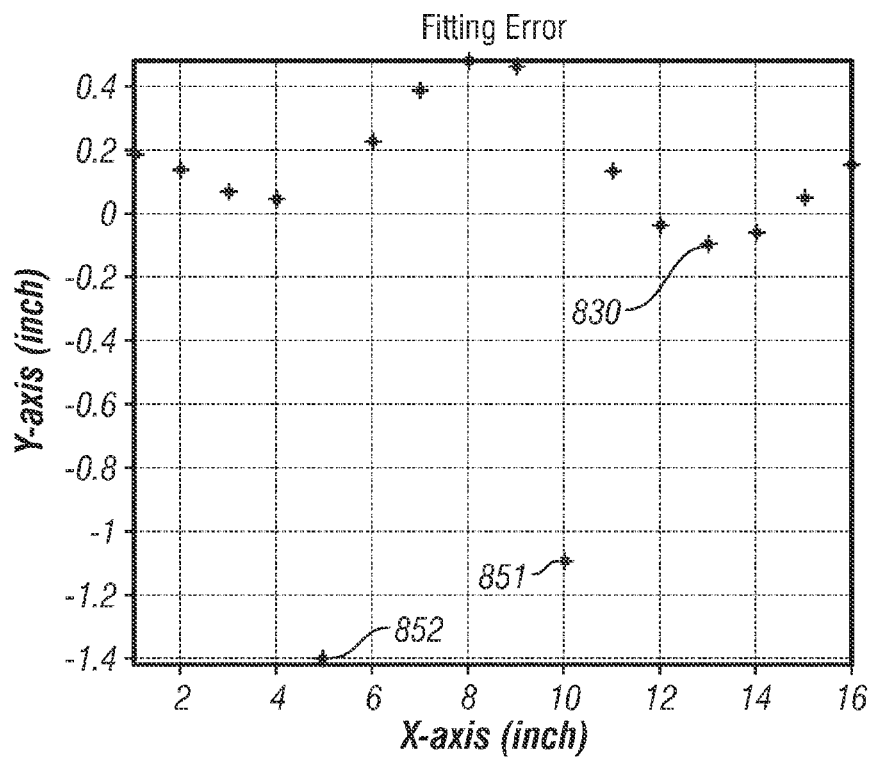
Figure 8D:
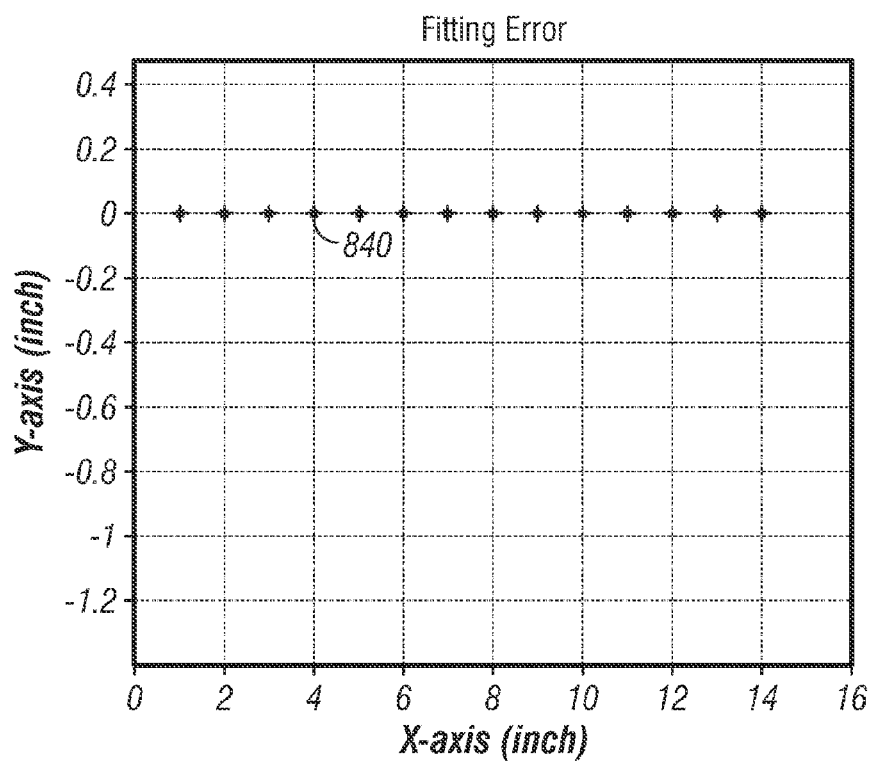

Another aspect of the curve fitting is the rejection of outliers in the measurements. This is illustrated in FIGS. 8A-8D. Shown in FIG. 8A are a set of data points of distances and an elliptical fit 810 to the entire set of points. FIG. 8C shows a plot of the fitting error (defined as the deviation from the best fit ellipse) for the data points. Note that the points in FIG. 8C have been "unwrapped" to double the distance in FIG. 8A. The points labeled as 851 and 852 would be recognizable as outliers to one versed in the art. In the present disclosure, the outliers are defined as those which have a residual error more than twice the standard deviation of the fit, though other criteria could be used. When the outliers 851 and 852 are removed from the curve fitting, the best fit ellipse 820 is believed to be a better representation of the borehole wall shape. The curve 840 of FIG. 8D shows that the fit is excellent.

Figure 9A:
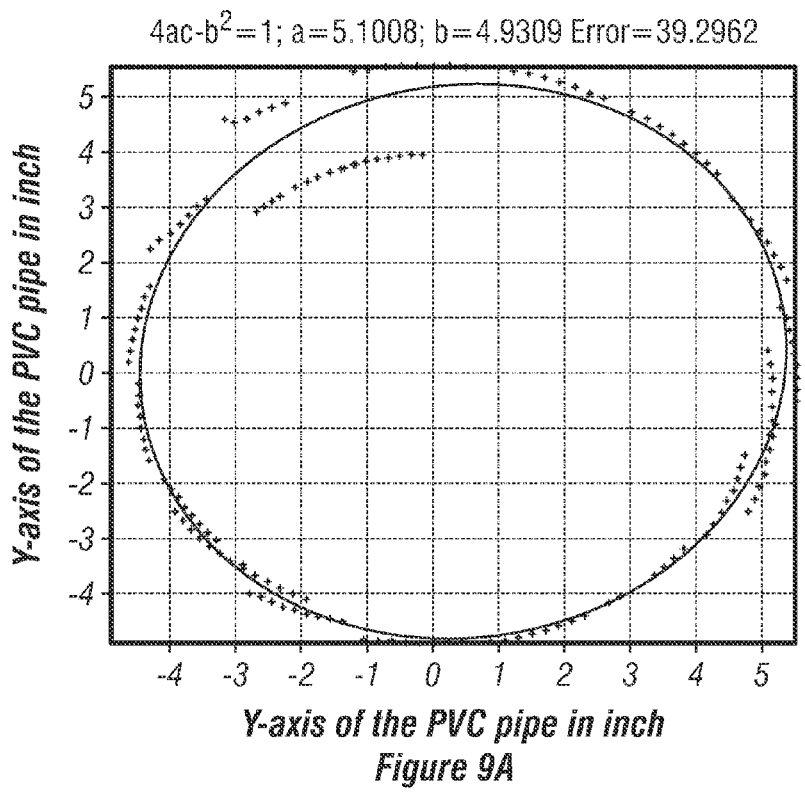
FIGS. 9A and 9B illustrate an example in which there is a stepwise displacement of the tool in a borehole.
Figure 9B:
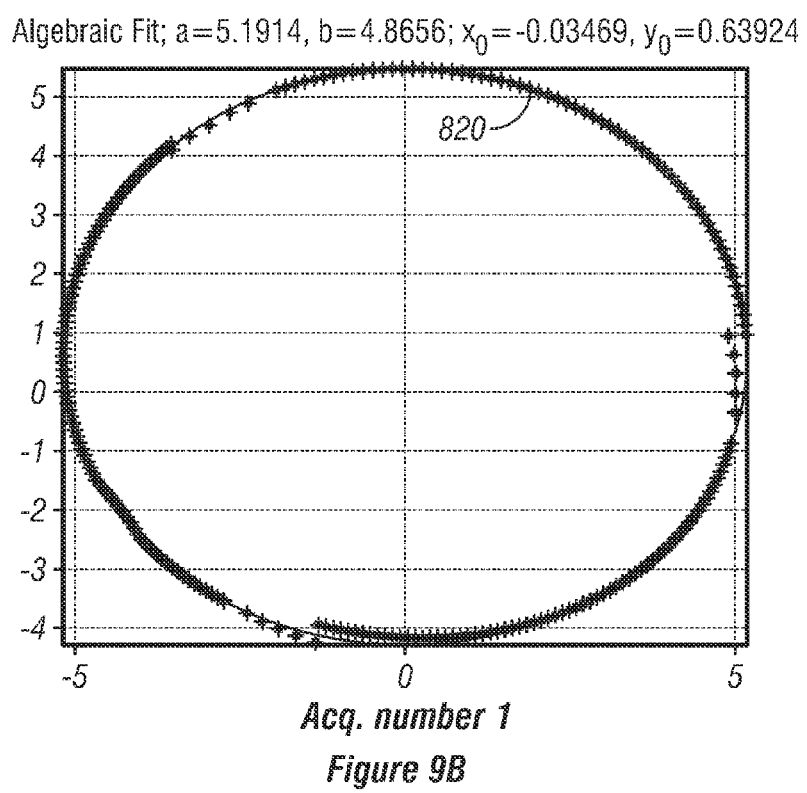

Turning now to FIGS. 9A and 9B, results of using the piecewise fit together with the rejection of outliers is shown. The data in FIG. 9A were generated as limited aperture data in which the tool center was laterally displaced at discrete times. This results in the discontinuous and segmented samples. FIG. 9B shows the results of using the method of the present disclosure. The reconstruction of the borehole wall is of good quality.

Figure 10:
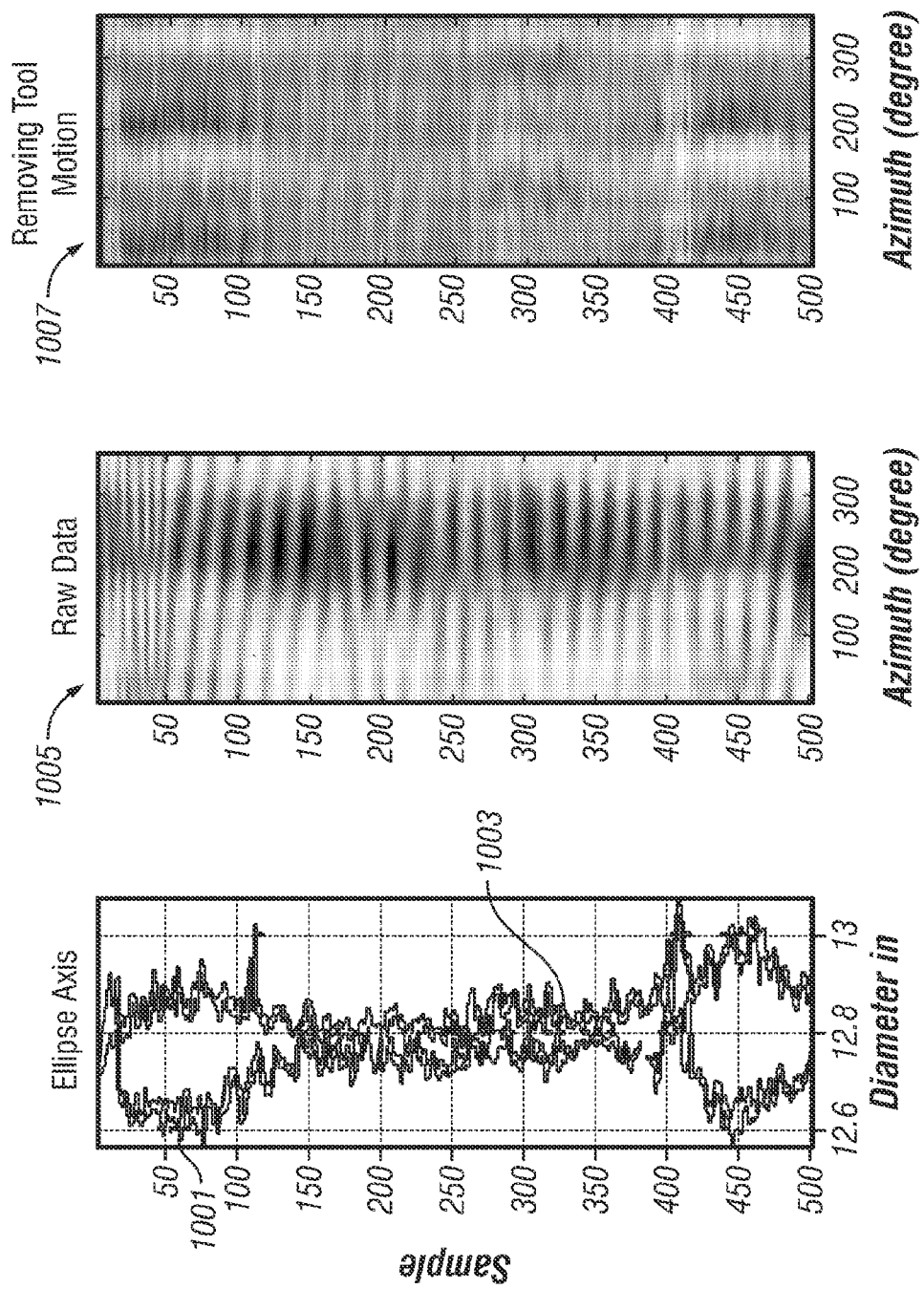
FIG. 10 shows exemplary results of the present disclosure on field measurements.

FIG. 10 shows another display that may be obtained with the present disclosure. The track on the left shows the estimated major 1001 and minor 1003 axis of an elliptical fit to the borehole wall. The track 1005 is a distance image of the borehole wall using the caliper measurements. The track 1007 is a corrected distance image in which the tool motion has been removed. An image such as this can help visualize such the size of the borehole and identify azimuthal variations that may be diagnostic of fracturing, washouts or formation stress.

Figure 11:
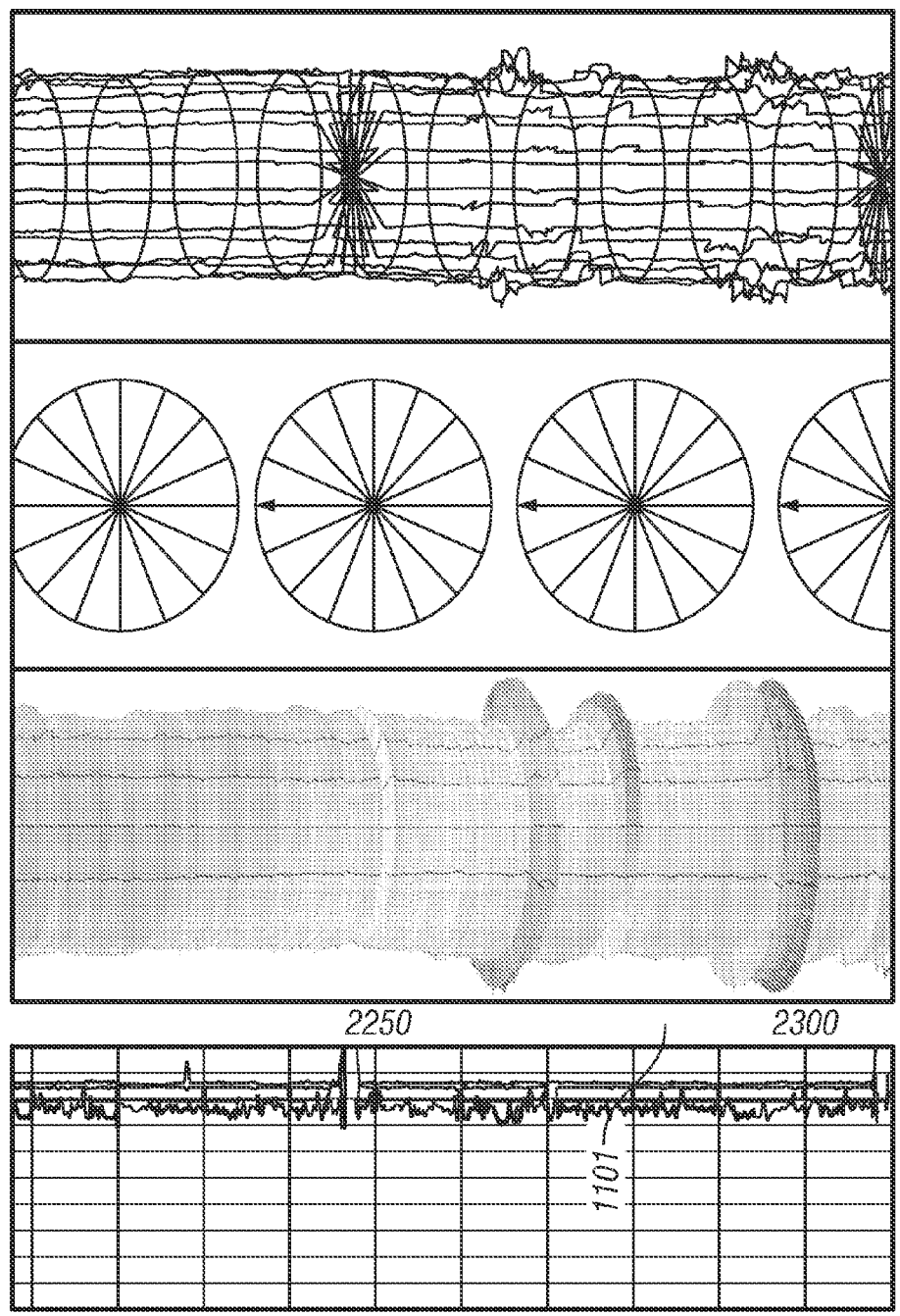
FIG. 11 illustrates an optional output display of a 3-D image of the borehole using the method of the present disclosure.

Turning now to FIG. 11, another display that may be obtained using the method of the present disclosure is shown. This is a 3-D view of the borehole wall constructed from the individual scans. The vertical axis here is the drilling depth. The right track of the figure shows a series of cross sections of the borehole. The middle track shows the 3-D view and zones of washouts such as 1101 are readily identifiable.

Figure 12A:
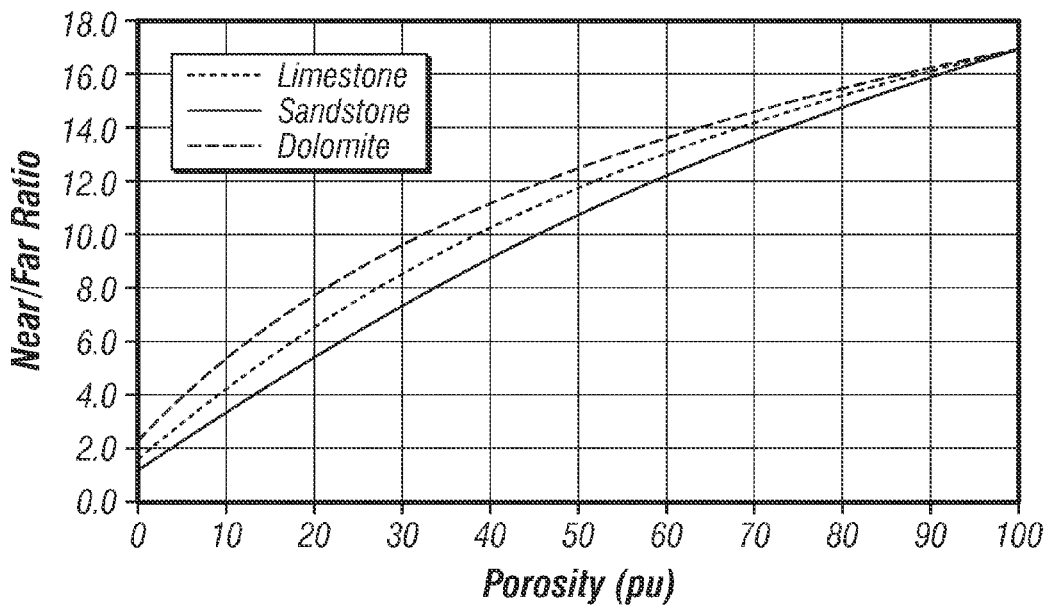
FIGS. 12A and 12B illustrate exemplary corrections to be applied to neutron porosity measurements.
Figure 12B:
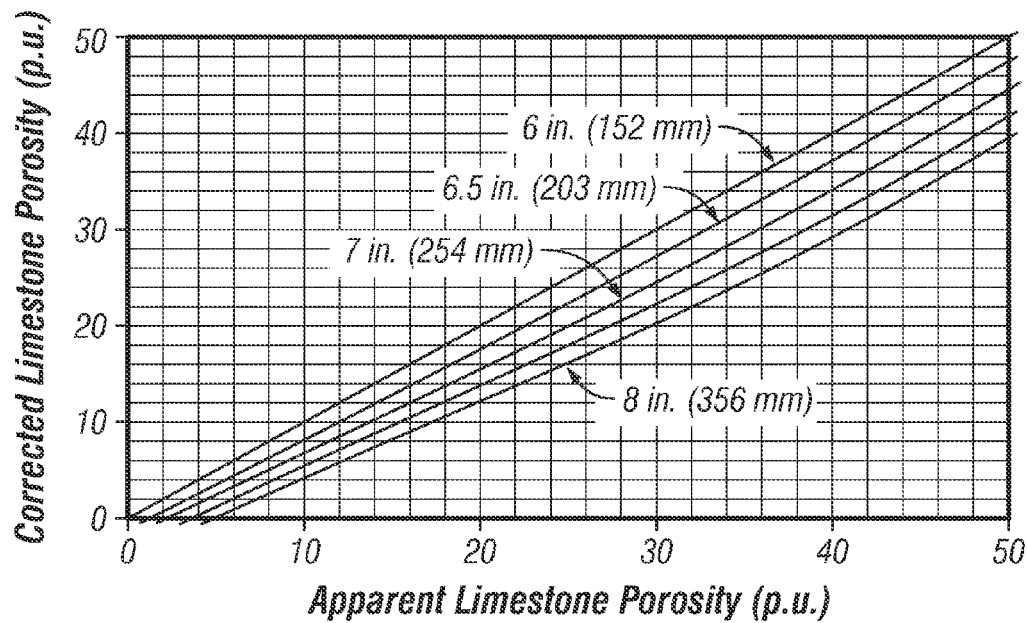

With the present disclosure, it is thus possible to estimate a standoff of the FE sensor at each depth and each rotational angle of the sensor during drilling of the borehole. This can be used to obtain more accurate estimates of the formation properties. For example, FIG. 12A shows typical relations between the ratio (Near/Far) counts to the porosity for different formation lithologies. FIG. 12B shows standoff corrections that may be applied based on measured calibration curves and the estimated standoff. As can be seen, the corrections curves depend upon the borehole diameter and the standoff. As discussed above, the method of the present disclosure estimates both of these quantities as a function of depth and the tool rotational angles.

The toolface angle measurements may be made using a magnetometer on the BHA. Since in many situations, the FE sensor and the magnetometer may operate substantially independently of each other, one embodiment of the present disclosure processes the magnetometer measurements and the FE sensor measurements using the method described in U.S. Pat. No. 7,007,00 to Cairns et al., having the same assignee as the present disclosure and the contents of which are incorporated herein by reference.

Figure 14:
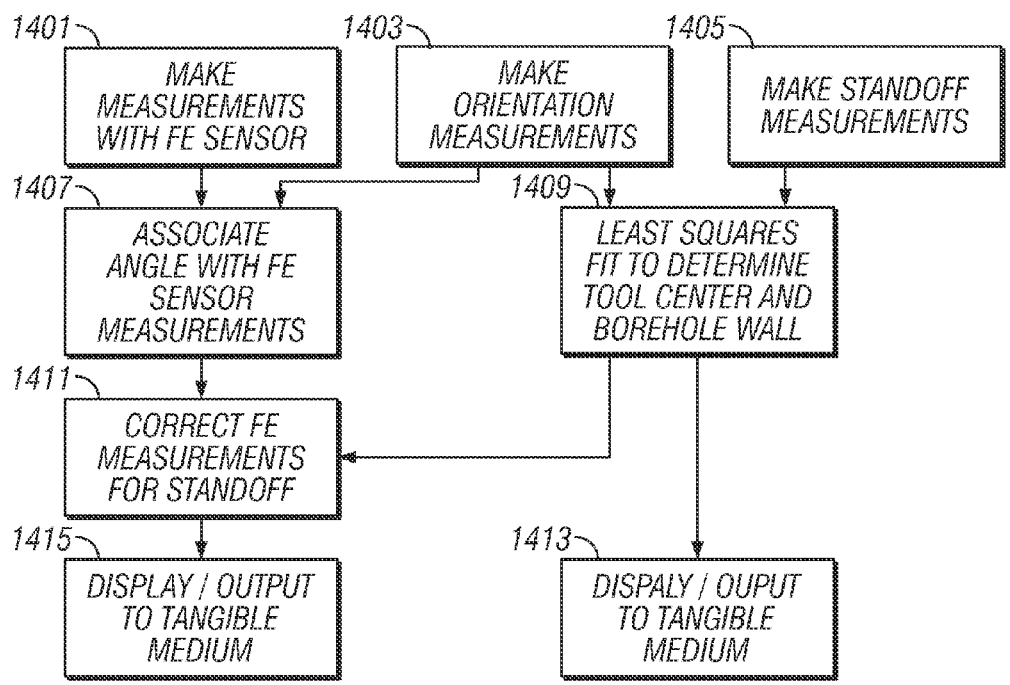
FIG. 14 is a flow chart illustrating some of the steps of the present disclosure.

Turning now to FIG. 14, a flow chart summarizing some of the steps of the present disclosure is shown. Measurements are made with a formation evaluation sensor 1401. It should be noted that while the disclosure has been described in terms of a neutron porosity sensor, other directionally sensitive sensors could be used. Concurrently, orientation measurements are made with an orientation sensor 1403. This could be a magnetometer, accelerometer or a gyroscope. The FE sensor measurements are associated with a toolface angle 1403. In the case of a neutron porosity sensor or other nuclear sensor, this may involve binning of the measurements. In addition, optional corrections may be made using the method of Cairns to identify the correct angle with a particular FE sensor measurement.

Concurrently, caliper measurements are made with a caliper such as an acoustic sensor 1405. The caliper measurements and the orientation angle measurements define the distance to the borehole wall in a tool centered, polar coordinate system. A least squares fit 1409 is done to the borehole wall distances in Cartesian (x and y) coordinates. The least squares fit may include such steps as fitting data points to an ellipse or a circle, rejection of outliers, and correction for measurements made with a limited aperture. The results of the fit may be displayed on a suitable device or recorded in a tangible medium such as a memory device 1413. Additionally, the FE measurements may be corrected 1411 using standoff values derived from the fitting procedure. The corrected FE measurements may then be displayed or output to a tangible medium. Specifically, the output may include a porosity image of the borehole or a density image of the borehole, such as that discussed in U.S. Pat. No. 6,584,837 to Kurkoski having the same assignee as the present disclosure and the contents of which are incorporated herein by reference.

Figure 13A:
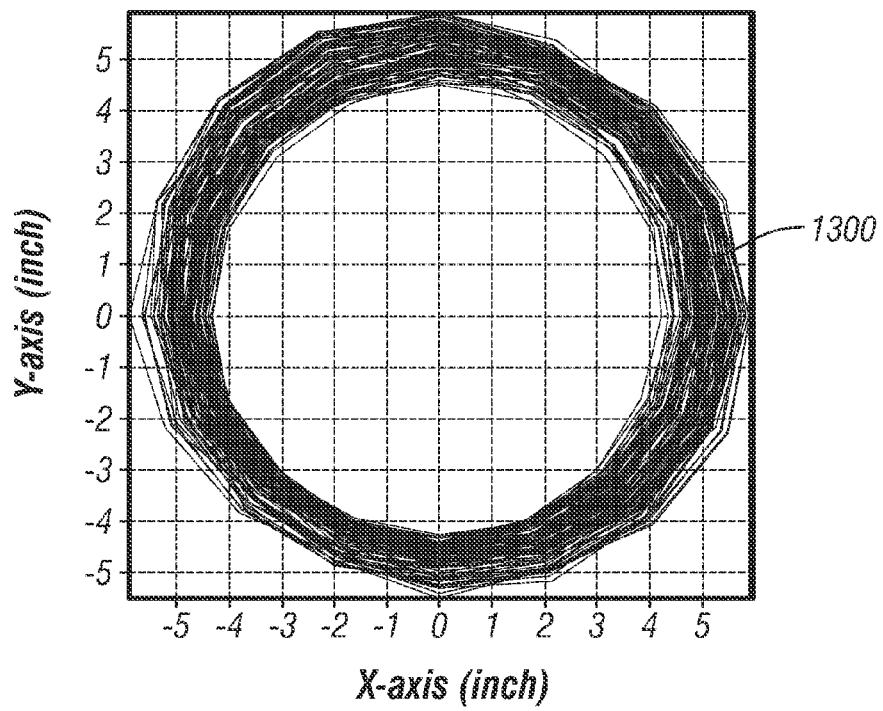
FIGS. 13A, 13B and 13C illustrate an error caused by use of an incorrect velocity in the method of the present disclosure.
Figure 13B:
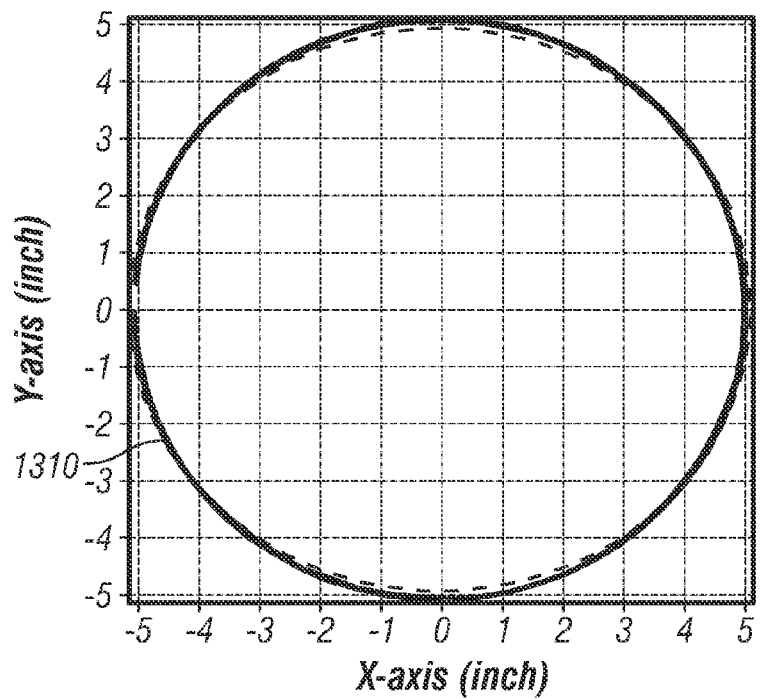
Figure 13C:
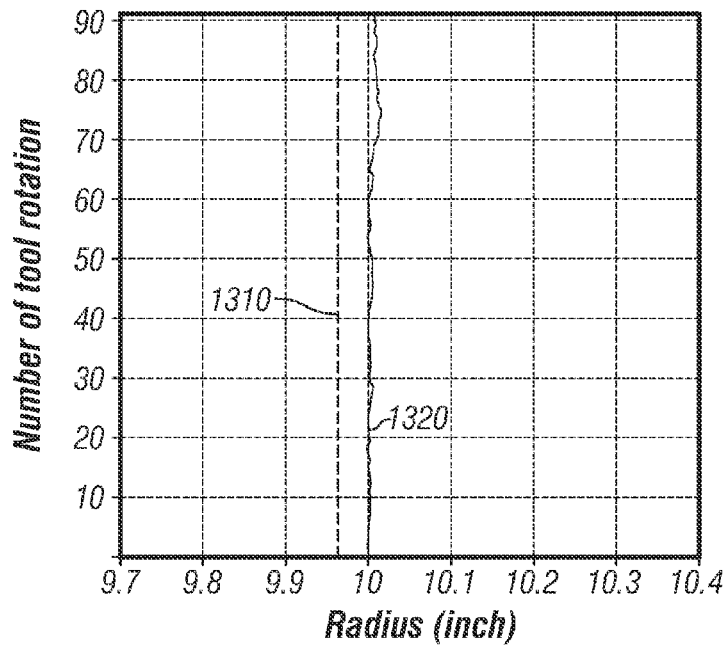

Another embodiment of the present disclosure may be used as a check on the assumed value of the acoustic velocity in the mud. Shown in FIG. 13A are distance plots over a plurality of 360° scans 1300. The curve 1310 in FIG. 13B is the least squares fit to the data using the method of the present disclosure. The size and shape of the borehole are plotted. This may be referred to as the borehole geometry. FIG. 13C shows the true value of the borehole diameter 1310 and the estimated diameter 1320. The difference suggests that the acoustic velocity used in the curve fitting was approximately 1% too high. Accordingly, one embodiment of the present disclosure uses a device such as that described in U.S. patent application Ser. No. 10/298,706 of Hassan et al. for measuring the acoustic velocity of the fluid. It should further be noted that using the estimated borehole geometry and an instantaneous measurement of standoff, the location of the tool within the borehole may be ascertained.

The disclosure above was made with reference to a caliper and FE sensor conveyed on a BHA. The method discussed above may also be used with wireline conveyed devices. Typical acoustic logging tools may include, by way of example, a circumferential televiewer which comprises a rotating ultrasonic acoustic transducer that operates in a frequency range on the order of 100 kHz or more. Higher acoustic frequencies are preferred in order to achieve better resolution in the confined space of a borehole. In operation, the televiewer rotates at a desired rate such as 5 to 16 rotations per second to continuously scan the borehole sidewall as the televiewer is drawn up the borehole at a rate that is typically 3/16 to 3/8 inch per scan. A beam of acoustic pulses is launched along the normal to the borehole sidewall as the transducer scans the interior surface of the borehole. The pulse rate depends upon the desired spatial resolution such as 1500 pulses per second or 128 to 256 pulses per scan. The insonified borehole sidewall returns pulses reflected therefrom, back to the transducer on a time-multiplexed basis. The reflected acoustic signals are detected, amplified and displayed to provide a continuous picture of the texture and structure of the borehole sidewall. Other application include determination of the goodness of a cement bond to a steel casing as well as monitoring the integrity of the casing itself.

Figure 15:
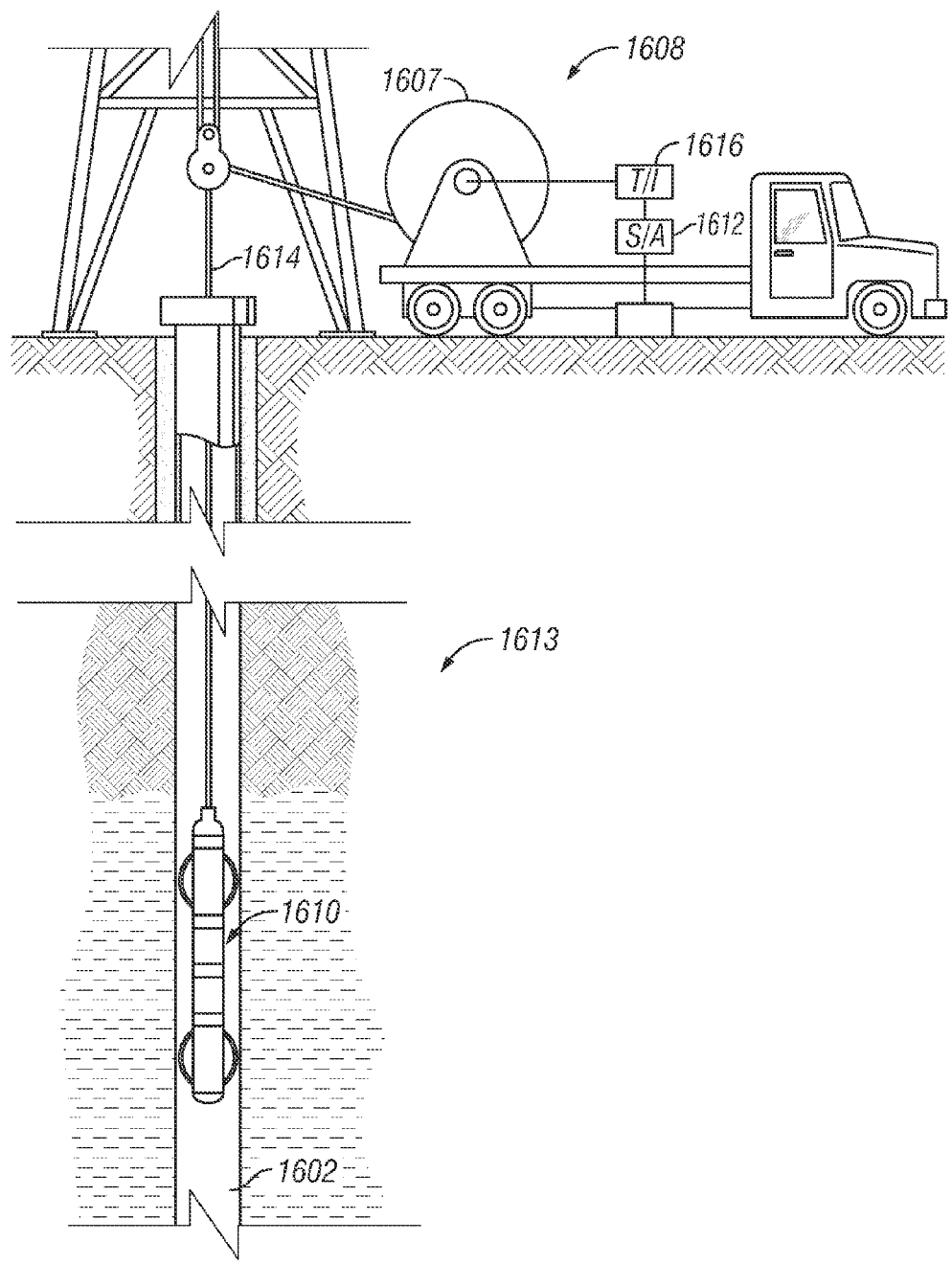
FIG. 15 shows an imaging well logging instrument disposed in a wellbore drilled through earth formations.

Referring to FIG. 15, a well logging instrument 1510 is shown being lowered into a wellbore 1502 penetrating earth formations 1513. The instrument 1510 can be lowered into the wellbore 1502 and withdrawn therefrom by an armored electrical cable 1514. The cable 1514 can be spooled by a winch 1507 or similar device known in the art. The cable 1514 is electrically connected to a surface recording system 1508 of a type known in the art which can include a signal decoding and interpretation unit 1506 and a recording unit 1512. Signals transmitted by the logging instrument 1510 along the cable 1514 can be decoded, interpreted, recorded and processed by the respective units in the surface system 1508.

Figures 16A, 16B:
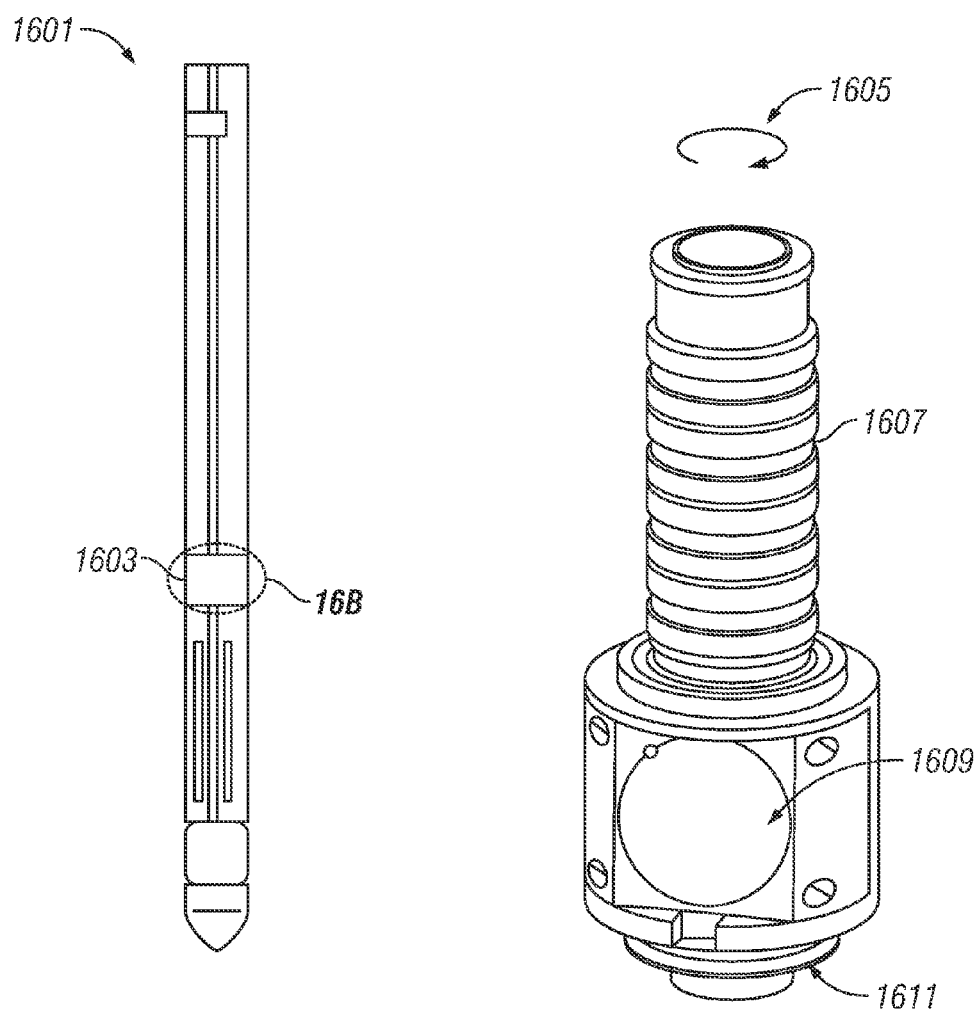
FIG. 16A shows the rotator assembly.
FIG. 16B shows the transducer assembly.

FIG. 16A shows mandrel section 1601 of an exemplary imager instrument with a Teflon® window 1603. Shown in FIG. 16B is a rotating platform 1605 with an ultrasonic transducer assembly 1609. The rotating platform is also provided with a magnetometer 1611 to make measurements of the orientation of the platform and the ultrasonic transducer. The platform is provided with coils 1607 that are the secondary coils of a transformer that are used for communicating signals from the transducer and the magnetometer to the non-rotating part of the tool.

The device discussed in FIGS. 16A-16B is commonly referred to as a borehole televiewer. It functions in a manner similar to the caliper discussed above by measuring transit times from the transducer to the borehole wall and back, and by measuring amplitudes of the received signals. While many wireline conveyed logging strings include a centralizer, this is not always the case, so that the televiewer signals may suffer from the same problems as the caliper measurements on a BHA. There are, however, some important differences between the two.

Firstly, wireline instruments are usually run at some time after the borehole is drilled. During this delay, it is common for the borehole to lose its integrity and suffer extensive washouts that are more severe than the borehole irregularities discussed above with BHA measurements. The televiewer can provide an image of the inside of a casing and can thus be used for casing evaluation. An advantage of the televiewer is that the rotation speed of the transducer is uniform, which is not the case with sensors on a BHA. The resulting periodicity of the measurements gives some redundancy which can be used to improve the signal-to-noise ratio.

The processing of the data may be done by a downhole processor and/or a surface processor to give corrected measurements substantially in real time. Implicit in the control and processing of the data is the use of a computer program on a suitable machine readable medium that enables the processor to perform the control and processing. The machine readable medium may include ROMs, EPROMs, EEPROMs, Flash Memories and Optical disks. Such media may also be used to store results of the processing discussed above.

What is claimed is:

1. A method of evaluating an earth formation, the method comprising:
   (a) conveying a logging string into a borehole;
   (b) making rotational measurements using an imaging instrument of a distance to a wall of the borehole;
   (c) processing the measurements of the distance to the borehole wall to estimate a geometry of the borehole and a location of the imaging instrument in the borehole; and
   (d) estimating a value of a property of the earth formation using a measurement made by a formation evaluation (FE) sensor, the estimated geometry and the estimated location of the imaging instrument.

2. The method of claim 1 further comprising measuring an amplitude of a reflected acoustic signal from the wall of the borehole.

3. The method of claim 1 further comprising:
   (i) estimating a standoff of the FE sensor, and
   (ii) estimating the value of the property of the earth formation using the estimated standoff.

4. The method of claim 1 further comprising providing an image of the distance to the borehole wall.

5. The method of claim 1 further comprising at least one of:
   (i) providing a 3-D view of the borehole,
   (ii) identifying a washout, and
   (iii) identifying a defect in a casing.

6. The method of claim 1 further comprising using the estimated geometry of the borehole to determine a compressional wave velocity of a fluid in the borehole.

7. The method of claim 1 further comprising binning the measurements made with the FE sensor prior to estimating the value of the property.

8. The method of claim 1 wherein estimating the geometry of the borehole further comprises performing a least squares fit to the measurements of the distance.

9. The method of claim 8 wherein estimating the geometry of the borehole further comprises at least one of: (i) rejecting an outlying measurement, and (ii) defining an image point when the measurements of the distance have a limited aperture.

10. An apparatus for evaluating an earth formation, the apparatus comprising:
    (a) a logging string configured to be conveyed into a borehole;
    (b) an imager configured to make rotational measurements of a distance to a wall of the borehole;
    (c) a formation evaluation (FE) sensor configured to make a measurement of a property of the earth formation; and
    (d) at least one processor configured to:
        (A) use the measurements of the distance to the borehole wall to estimate a geometry of the borehole and a location of the imager in the borehole, and
        (B) estimate a value of the property of the earth formation using the measurement of the FE sensor, the estimated geometry and the estimated location of the imager.

11. The apparatus of claim 10 wherein the imager is further configured to make measurements of an amplitude of acoustic signals reflected from the borehole wall.

12. The apparatus of claim 10 wherein the at least one processor is further configured to provide an image of the distance to the borehole wall.

13. The apparatus of claim 10 wherein the at least one processor is further configured to at least one of:
   (i) provide a 3-D view of the borehole,
   (ii) identify a washout, and
   (iii) identify a defect in a casing.

14. The apparatus of claim 10 wherein the at least one processor is further configured to use the estimated geometry of the borehole to determine a compressional wave velocity of a fluid in the borehole.

15. The apparatus of claim 10 further comprising a wireline configured to convey the logging string into the borehole.

16. The apparatus of claim 10 wherein the at least one processor is further configured to:
   (i) estimate a standoff of the-formation evaluation (FE) sensor, and
   (ii) use the measurement made by the FE sensor and the estimated standoff to estimate the value of the property of the earth formation.

17. The apparatus of claim 16 wherein the at least one processor is further configured to bin the measurements made with the FE sensor prior to estimating the value of the property.

18. The apparatus of claim 16 wherein the at least one processor is further configured to estimate the geometry of the borehole by performing a least squares fit of the measurements of the distance.

19. The apparatus of claim 18 wherein the at least one processor is further configured to estimate the geometry of the borehole by at least one of: (i) rejecting an outlying measurement, and (ii) defining an image point when the measurements of the distance have a limited aperture.

20. A non-transitory computer readable medium product having thereon instructions that when read by a processor cause the processor to perform a method, the method comprising:
   using rotational measurements of a distance to a borehole wall made by an imager on a logging string for estimating a geometry of the borehole and a location of the imager in the borehole; and
   estimating a value of a property of an earth formation using a measurement of a formation evaluation sensor on the logging string, the estimated geometry and the estimated location of the imager.

21. The medium of claim 20 further comprising at least one of: (i) a ROM, (ii) an EPROM, (iii) an EEPROM, (iv) a flash memory, and (v) an optical disk.

* * * * *